United States Patent
Stolcman et al.

(10) Patent No.: US 10,474,512 B1
(45) Date of Patent: Nov. 12, 2019

(54) INTER-PROCESS INTRA-APPLICATION COMMUNICATIONS

(71) Applicant: Amazon Technologies, Inc., Reno, NV (US)

(72) Inventors: Jacek Stolcman, Laguna Beach, CA (US); Walter Terry Heatlie, Corona, CA (US); Steven Michael Saxon, Irvine, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 410 days.

(21) Appl. No.: 15/280,851

(22) Filed: Sep. 29, 2016

(51) Int. Cl.
*G06F 9/54* (2006.01)
(52) U.S. Cl.
CPC .................... *G06F 9/544* (2013.01)
(58) Field of Classification Search
CPC .......................................... G06F 9/544
See application file for complete search history.

(56) References Cited

U.S. PATENT DOCUMENTS

| 6,292,820 B1* | 9/2001 | Korn ................. G06F 8/51 718/100 |
| 9,760,399 B1* | 9/2017 | Fraser .............. G06F 9/485 |
| 2009/0037929 A1* | 2/2009 | Shimko ........... G06F 21/606 719/312 |
| 2012/0143848 A1* | 6/2012 | Boehm ........... G06F 16/2393 707/722 |

* cited by examiner

*Primary Examiner* — S. Sough
*Assistant Examiner* — Kimberly L Jordan
(74) *Attorney, Agent, or Firm* — Polsinelli LLP

(57) ABSTRACT

Multiple processes of an application (or multiple applications capable of sharing private data) of a mobile device can communicate in a process-safe, secure, and efficient manner via a shared private file system. A first process can produce shared data for a second process to consume via the file system. For example, when the shared data changes, the first process can write a new file to the private file system and rename the new file to a specified file name. When the second process needs the shared data, the second process can evaluate certain metadata of the new file, such as a timestamp or a field comprising a monotonically increasing number. If a stored metadata value associated with the specified file name is less than the metadata value of the new file, the second process can safely retrieve the shared data from the new file.

6 Claims, 4 Drawing Sheets

INTER-PROCESS INTRA-APPLICATION COMMUNICATIONS

BACKGROUND

Multitasking is a computing device's ability to simultaneously run multiple applications. For example, the computing device can execute instructions associated with multiple applications in parallel using multiple processors and/or execute instructions associated with multiple applications concurrently using a single processor (e.g., the computing device may apportion time for execution by the single processor among the multiple applications. The processor can execute the instructions of each application one at a time for a duration within the application's apportionment of time, and if execution is not complete during that application's apportionment of time, the computing device pauses execution of the instructions of that application and the processor executes the instructions of one or more other applications. The processor can later resume execution of the instructions of the initial application after the apportionments of time for the other applications). A computing device that supports multitasking can allow a user to operate multiple applications at the same time, such as to directly interact with one application while the device executes the instructions of additional applications in different windows or in the background and/or to rapidly switch between applications. Multitasking can also maximize effective utilization of a computing device's resources. For instance, the computing device can prioritize execution of the instructions of an application's user interface to ensure a specified degree of responsiveness during periods of time a user directly interacts with the application and can efficiently manage execution of the instructions of other components of the application during periods of time when there is no user input.

BRIEF DESCRIPTION OF THE DRAWINGS

Various embodiments in accordance with the present disclosure will be described with reference to the drawings, in which.

Figure 1:
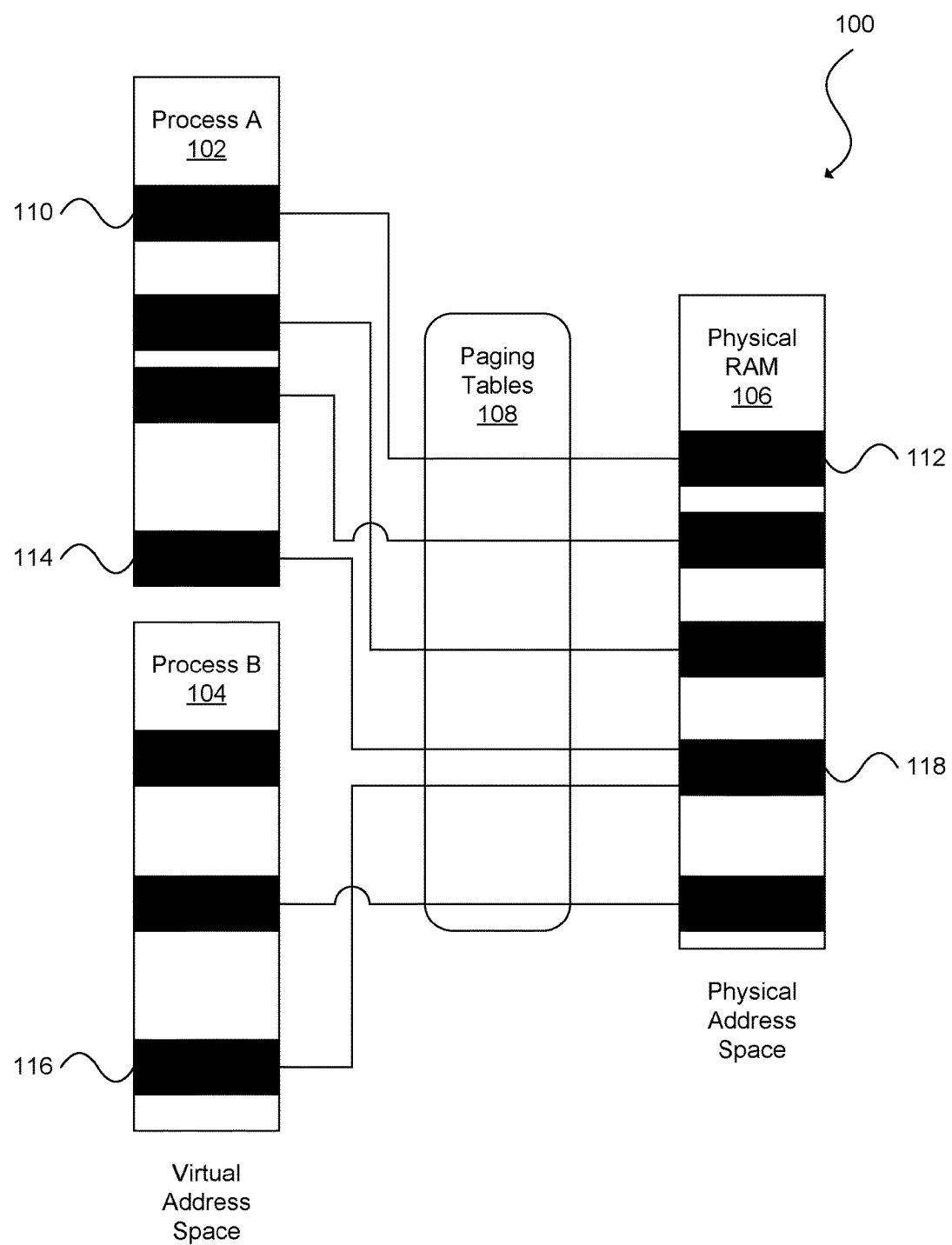
FIG. 1 illustrates a block diagram of an example architecture for memory management that may be used in an embodiment.

While the disclosed technology described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must) Similarly, the words "include", "including", and "includes" mean including, but not limited to.

DETAILED DESCRIPTION

As discussed, a computing device that supports multitasking can offer users various benefits. However, multitasking can largely depend on the properties of a particular computing device, such as the type and amount of memory, processing, storage, power, and other resources available to that computing device. For example, some types of computing devices are preferably small and thin and accommodation of this form factor can constrain the amount of memory these devices can incorporate. As another example, some computing devices may not support swapping, i.e., moving a process between main memory (also referred to as random-access memory (RAM), prime memory, system memory, physical memory, etc.) and storage (also referred to as hard disk drive or disk, internal storage, mass storage, auxiliary storage or memory, secondary storage or memory, external storage or memory, persistent storage or memory, non-transient storage or memory, etc.) during periods of time the process is active (i.e., a central processing unit (CPU) executes instructions associated with the process) or inactive (also referred to as idle, paused, stopped, suspended, disabled, in the background, etc.). This may be because some computing devices use flash memory as storage, and flash memory can be limited to a number of write operations substantially less than other types of storage. As yet another example, some computing devices may operate on battery power, and continuous processing would quickly drain the batteries of such devices.

Due to these and other restraints, some computing devices may provide multitasking by implementing memory management systems for terminating certain processes under low-memory conditions. A common memory management scheme is to kill applications that a user is not directly interacting with to reclaim memory for applications directly interacted with by the user. In certain situations, however, such behavior may lead to a poor user experience. For example, a user may operate a first application of a computing device that loads a second application into memory to provide various services such as providing access to data located remotely from the computing device, streaming media content from a network location, displaying geographic map information, creating or updating social network information, among other purposes. The second application may be associated with an amount of main memory that results in termination of the first application to free up the memory needed to execute the instructions of the second application. Upon exiting the second application (e.g., attempting to navigate back to the first application, completing a task associated with the second application, terminating the second application, etc.), there may be a noticeable delay in bringing up the first application due to having to reload a process associated with the first application back into main memory and to recover the previous state of the first application. Alternatively, the previous state of the first application may be unrecoverable due to lack of such functionality altogether or the inability to recover the exact previous state of the first application (e.g., a health or status of a game character or a particular location of a level of a game, a particular location within a content item, a particular location within a collection of content items, a particular location of a geographic map, user inputted text to a form or document, etc.). Provided herein are technical solutions to these and other problems.

In some embodiments, refactoring a first application to execute within multiple processes may reduce the likelihood that a computing device reaches a low-memory state so as to terminate a launching application (e.g., a second application including instructions for loading one or more processes of the first application into memory, causing a central processing unit (CPU) to execute the instructions of the first application, and/or causing the first application to become a foreground application, etc.). As used herein, an application is a passive entity, such as a file including a list of processor-executable instructions stored on disk (sometimes represented as an executable file). A process, on the other hand, is an active entity, and includes more than a list of instructions (sometimes referred to as the text section) for the CPU to execute. For example, a process also includes a state or context, such as represented by the value of a program counter and contents of processor registers. A process can also include a stack, which can comprise temporary data (function parameters, return addresses, local variables, etc.) and a data section (e.g., static variables, global variables, etc.). In some embodiments, a process can also include a heap, which is memory allocated to a process during run time. An application can become a process (i.e., become active) upon loading the application's executable file representation into memory and allocating other resources for execution, such as a data section, stack, and heap, in memory. An active application can include one or more processes. When an active application includes multiple processes, each process can have its own data, heap, and stack sections. In some embodiments, multiple processes of a single active application or multiple related active applications can share a text section. It should be understood by one of ordinary skill that a process is different from a thread. A thread is an entity within a process that is schedulable for execution. Every process includes one or more threads but not every thread is equivalent to a process. For instance, each thread may have its own exception handler(s), scheduling priority, local storage, unique thread identifier, thread context (e.g., machine register(s), kernel stack, thread environment block, user stack in the address space of the thread's process), and security context. However, multiple threads of the same process share virtual address space and system resources.

In one embodiment, an electronic commerce application (e.g., an application of a computing device associated with tasks such as user authentication, in-app purchasing, digital rights management, recommending products, purchasing of products from an online marketplace, and other related functions) can be split into multiple processes, such as one or more first processes for handling one or more discrete functions or tasks of the electronic commerce application and one or more second processes for handling heavy-weight functions or tasks of the electronic commerce application. For instance, a first light-weight process can be responsible for in-app purchasing or digital rights management while a second larger or heavy-weight process can be responsible for other functions of the electronic commerce application, such as synchronizing data in local storage of the computing device and network storage of product information for items of the online marketplace or maintaining user purchase history and product recommendations. The first light-weight process may take up a small amount of main memory during execution, such as measured by virtual set size (VSS) or the accessible address space of a process; resident set size (RSS) or the amount of memory held in random-access memory (RAM) for a process, including shared memory; proportional set size (PSS) or the amount of memory held in RAM for a process and a proportion of shared memory with one or more other processes; unique set size (USS) or the amount of private memory for the process; and other methods of accounting for main memory utilization by a process. The second process can be a heavy-weight process, or a process that occupies a larger amount of main memory than a light-weight process, that can provide full(er) functionality of the electronic commerce application using an amount of main memory as large as necessary to provide the first process with data to complete the first process's discrete task. In this manner, the likelihood of terminating a launching application, which may cause the computing device to flush the entire process space (i.e., text, data, heap, and stack) associated with the launching application, can be substantially reduced (i.e., reduced according to a specified number of times within a determined period of time) or eliminated because of the reduction of the respective amount of main memory utilized by the first process and the second process.

In some embodiments, the refactoring of an application that minimizes termination of a launching application can include deploying one or more first processes as consumers (i.e., objects that read data) and one or more second processes as producers (i.e., objects that write data) to enable logic for determining the data to be consumed by the first processes to reside in the instructions associated with the second processes. One conventional approach for implementing this producer-consumer design pattern is to utilize a platform's inter-process communication mechanism(s) for sharing data across process boundaries. However, such an approach may require instantiation of both the first processes and the second processes and defeats the purpose of deploying the application as separate processes in the first place. For example, Android or FireOS® are operating systems based on the Linux kernel that can be incorporated in certain computing devices (e.g., smart phones, tablets, wearable devices, etc.) and other embedded systems (e.g., televisions, television (micro)consoles, media players, game consoles, digital cameras, automobiles, notebook computers, etc.). Android and FireOS offer an inter-process interface referred to as a "Content Provider" to connect data in one process with code running in another process. Implementing a content provider requires that both the first process and the second process be resident in main memory during execution such that there is no reduction in the respective amounts of memory allocated to the first and second processes.

Another technique for providing the producer-consumer pattern is to employ readable-writable shared memory associated with multiple processes of an application for inter-process communication. Implementations of these approaches, however, are not process-safe (i.e., can result in corruption of the shared data). As an example, certain operating systems include SQLite as a shared library for storing structured data, such as contact or calendar information. SQLite is a relational database management system often utilized as an embedded database for an application. SQLite relies on file-system locks for ensuring data integrity of a database when multiple processes access the database at the same time. Although SQLite employs reader-writer locks, SQLite is known to corrupt the files that make up the database when multiple processes simultaneously attempt to access the files. As a related example, Android and FireOS provide a framework referred to as "SharedPreferences" for storing key-value pairs of primitive data (e.g., booleans, numbers, strings, etc.). SharedPreferences are also not process-safe because access at the same period of time by multiple processes of the underlying file(s) that include data of the SharedPreferences can also corrupt the data. In addition, changes to SharedPreferences are saved to storage at indeterminate periods of time such that it is unknown whether the data of the SharedPreferences accurately reflects the most up-to-date data.

Disclosed are systems and methods for sharing data between multiple processes (i.e., inter-process) of a single application or multiple applications developed by the same application provider (e.g., Android or FireOS apps signed using the same private key, iOS App Groups, Windows Publisher Cache, etc.) (i.e., intra-application) or that otherwise share a readable/writeable portion of memory. Applications that may be susceptible to low-memory conditions can be designed to execute within multiple processes, such as a first process associated with instructions for consuming data from a second process associated with instructions for producing the data. The application(s) may be launched from another application to perform a discrete task. The first process may be a light-weight process associated with handling the specific task. The second process can be a heavy-weight process associated with providing the data necessary to complete that task, upon which the computing device can suspend execution of the instructions associated with the second process. The memory utilized by the second process can then be made available to other processes, such as one or more processes of the launching application. Thus, the application(s) may only utilize an amount of main memory necessary to perform the task. This can minimize the chance of the computing device terminating the launching application and/or other applications.

In some embodiments, multiple processes can communicate with one another using shared readable/writeable memory and atomic (i.e., effectively occurring instantaneously) operations for updating shared data. For example, the shared memory can include a private file system on the computing device that is accessible to a first process associated with instructions for consuming the shared data and a second process associated with instructions for producing the shared data. When the shared data changes and a file having a specified file name (e.g., F) does not exist in the private file system, the second process can write the changed data to a new file having the specified file name. Writing the new file to the private file system can be an atomic operation if the new file is not available to the first process until the new file is completely written to the private file system.

When the first process needs shared data, the first process can check a timestamp or other suitable metadata (e.g., a metadata field comprising a monotonically increasing (or decreasing) number) of a file in the private file system. For example, the metadata field can be a new metadata field or the metadata field can be a part of a file name (e.g., F_1, F_2, etc.). If the first process has never attempted to read a file having a specified file name or if a predetermined timestamp or other suitable metadata corresponding to a file having the same file name is older than the timestamp or has a smaller value for a metadata field (or a greater value if monotonically decreasing), the first process can safely retrieve shared data from the file in the private file system.

When the shared data changes and a file having a specified file name (e.g., F) does exist in the private file system, the second process can write a new file (e.g., F') to the private file system and then rename the new file to the specified file name (e.g., from F' to F). If the first process reads from F during a period of time that the second process writes F' to the private file system, the first process nevertheless observes a consistent view of the shared data and the first process can retrieve the shared data from F' (now named F) the next time the first process needs the shared data. In this manner, the writing of the new file and the renaming of the new file can be considered an atomic operation at least with respect to the first process.

Additional functions and advantages are described and suggested below as may be provided in accordance with the various embodiments.

Figure 4:
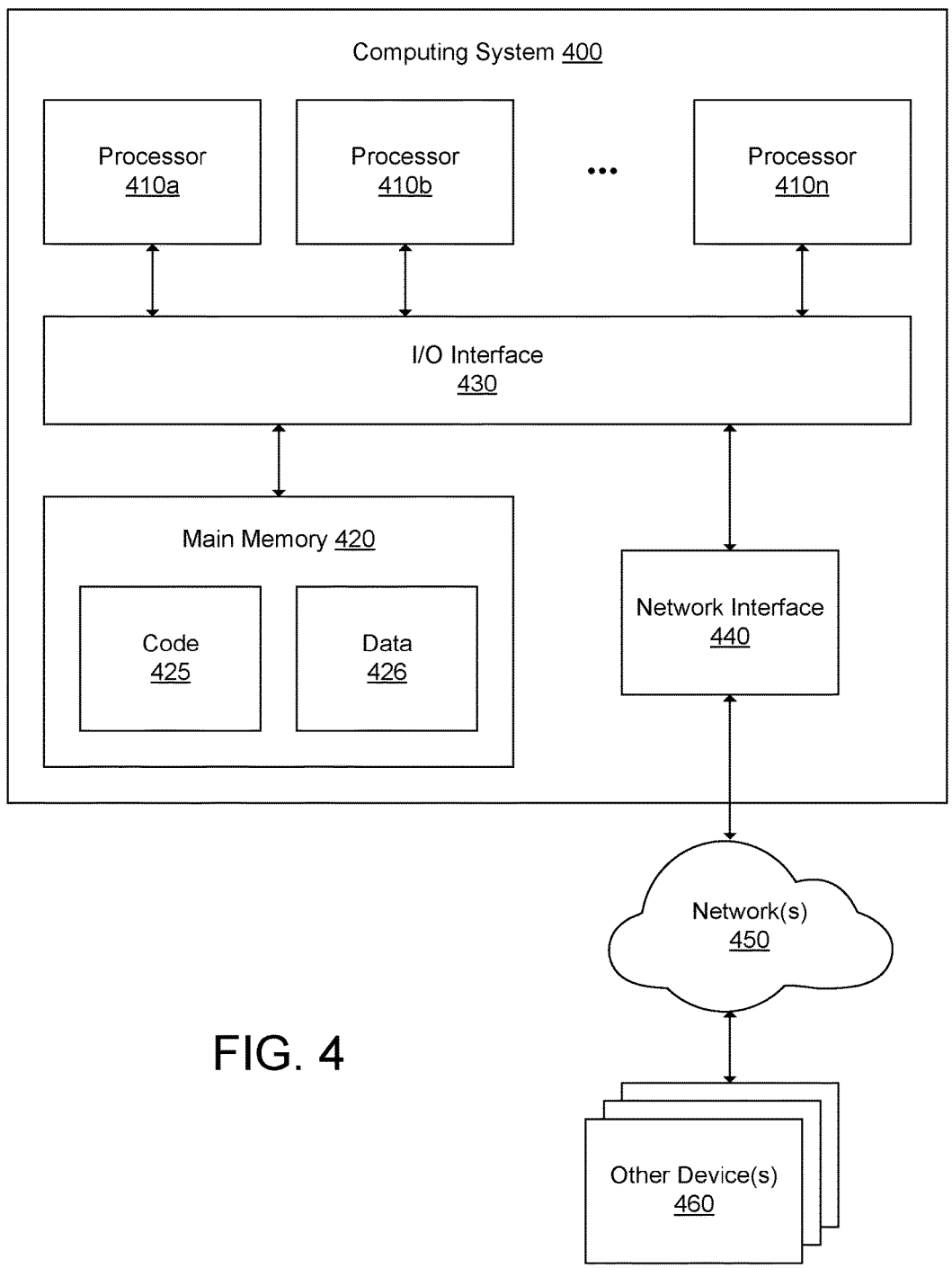
FIG. 4 is a block diagram illustrating an example computing system that may be used in some embodiments.

FIG. 1 illustrates a block diagram 100 of an example architecture for managing the memory of a computing device (not shown) that is capable of multi-tasking. With respect to various embodiments of the disclosed technology, an exemplary system 400 as shown in FIG. 4 may be used to implement the memory management system of FIG. 1. Each of the components of FIG. 1 is discussed in more detail below; however, it should be understood by one skilled in art, that the system shown in FIG. 1 and any other system discussed herein is but one possible configuration and that other configurations with more or less components are also possible.

Block diagram 100 includes a first virtual address space 102 associated with a first application including Process A; a second virtual address space 104 associated with a second application including Process B; a physical address space 106 associated with physical RAM, and paging tables 108 (also referred to as a memory management unit (MMU) or page memory management unit (PMMU)). Although the first and second applications only use a single process in this example, it should be understood that a single active application can execute within multiple processes, and multiple active applications may execute within one or more shared processes. As discussed, Processes A and B may each include a process space comprising a text section, data section, stack, and heap.

In some embodiments, Process A may be part of an application that launches Process B, and Process B can be part of an application for providing user authentication, in-app purchasing, digital rights management, product recommendations, product purchasing from an online marketplace, access to data located remotely from a mobile computing device, streaming media content from a network location, geographic map information, creating or updating social network information, among many other possibilities.

Address spaces 102 and 104 are virtualized (i.e., the addresses are abstracted from physical RAM), which can enable many address spaces to exist and each process to reside in its own address space. Address spaces 102 and 104 comprise virtual memory addresses which allow multiple processes to each have an independent address space that can map, alone or in aggregate, to a smaller physical address space, such as physical address space 106. In addition to supporting processes that can take up more memory than the actual amount of memory of the computing device, this design can also provide for security among processes because each address space can be independent and isolated from one another.

An example of a mechanism for translating virtual address spaces 102 and 104 to physical address space 106 are paging tables 108. In various embodiments, paging tables 108 can be implemented in hardware, software, firmware, or a combination thereof. For example, in some embodiments, hardware can provide the mapping of virtual address spaces 102 and 104 to physical address space 106 and software/firmware (e.g., an operating system or kernel) can configure and manage paging tables 108.

The benefits of the memory management design shown in FIG. 1 can include efficient usage of physical memory and support for multi-tasking on a computing device. In this example, a contiguous portion (i.e., page 110) of virtual address space 102 maps to a portion (i.e., page 112) of physical RAM having the same size as page 110. Although Process A may have a large address space, virtual address space 102 is sparse, i.e., only a small number of regions of virtual address space 102 maps to physical RAM. This may require that a computing device using the memory management scheme of FIG. 1 to be capable of handling over-commitment of physical memory (i.e., ensuring segments of instructions of a process necessary for execution will be resident in physical memory in a timely fashion). In some embodiments, this can be achieved by terminating less critical processes to reclaim the memory allocated to lower priority processes when there is insufficient memory for more critical processes, and when terminated processes are needed again, reallocating the terminated processes in memory. Such behavior permits a computing device to support multi-tasking despite memory and/or power constraints.

FIG. 1 also shows how Process A and Process B can share memory across process boundaries. For example, page 114 of Process A and page 116 of Process B both map to page 118 of physical RAM. Shared memory can be used to conserve physical memory. For instance, instead of allocating multiple pages of physical memory that contain the same data to separate virtual address spaces, a single instance of the data can be loaded onto physical memory and page tables 108 can map segments of multiple virtual address spaces to a single page. Shared memory is often implemented for shared or dynamic libraries that include the same readable/non-writeable code and data.

In some embodiments, shared memory may implement a mode referred to as "copy-on-write." This allows paging tables 108 to defer making a private copy of the data within a process's address space until the process writes to a page of the shared memory. After the page has been modified, paging table 108 can allocate a private copy of the modified page and update the mapping of the virtual address space to physical memory for that process. Other processes may be unaffected and can still map to the original shared page.

Figure 2:
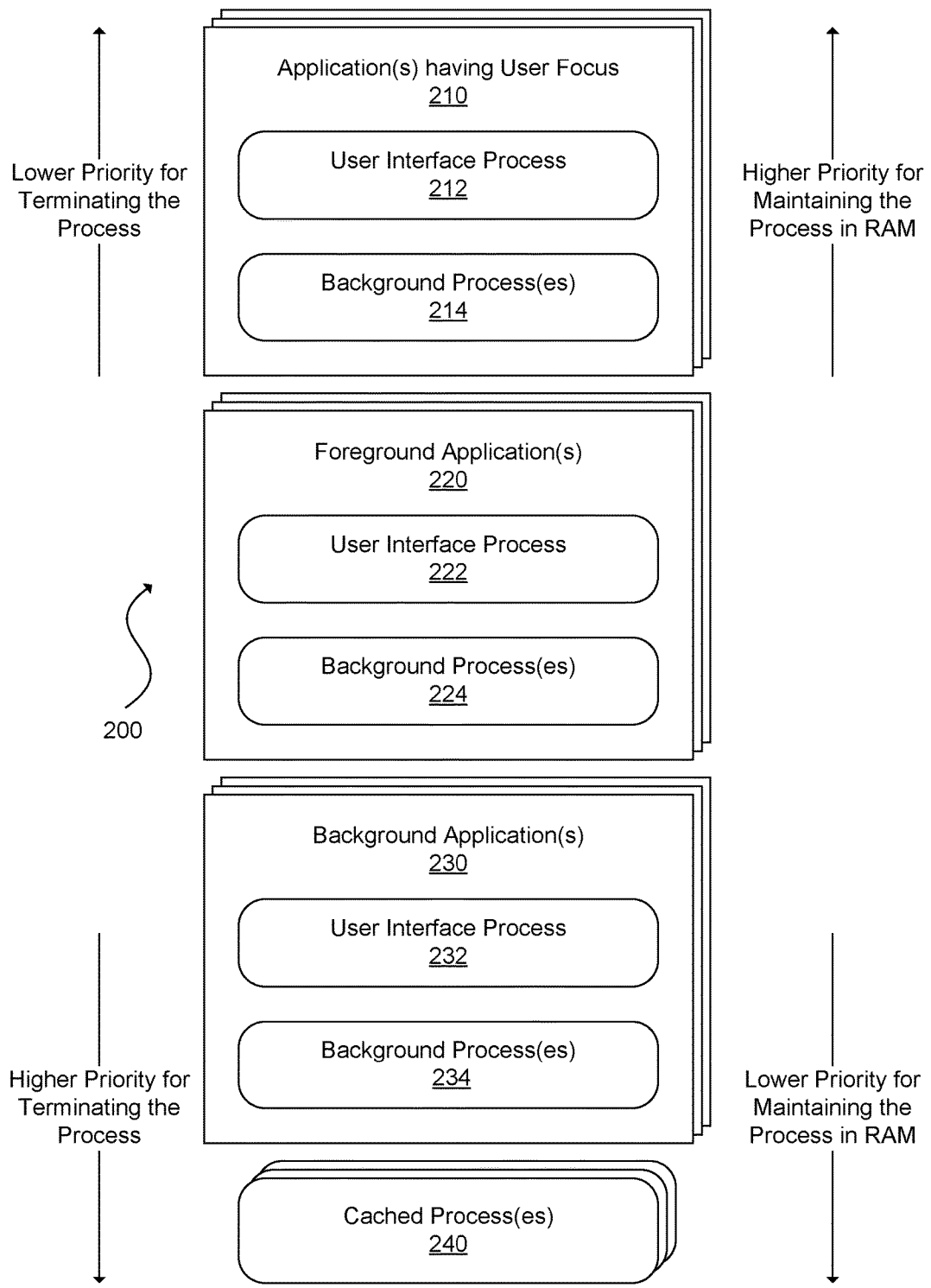
FIG. 2 illustrates a block diagram of an example process termination strategy that may be used in an embodiment.

Under low memory conditions, a memory management system of a computing device that supports multi-tasking may determine that one or more processes must be terminated to free up enough memory in order to execute the instructions associated with one or more higher priority processes. The memory management system can make the determination of the respective priorities of multiple processes using a process termination strategy, such as shown in FIG. 2. In this example, process termination strategy 200 indicates from top to bottom the criticality of processes (i.e., the order of priority for terminating a process from lowest priority to highest priority or the order of priority for maintaining a process in physical memory from highest to lowest) is processes of an active application having user focus 210, processes of active foreground application(s) 220, processes of active background application(s) 230, and cached process(es) 240.

Active application(s) having user focus 210 may include an application with which a user is directly interacting. As an example, an application may be associated with a graphical user interface (GUI) that can receive touch gestures as input and active application(s) 210 can include the application that currently receives a touch input. As another example, an application may be capable of recognizing speech and responding back to a user via speech, and active application(s) 210 may include the application currently "speaking" with the user. In an embodiment, only a few active applications 210 may exist at any given time, and process termination strategy 200 may dictate killing these applications as a measure of last resort, such as if memory is so low that active application(s) 210 cannot continue to run. At such point, the device has reached a state in which killing one or more processes of active application(s) 210 may be necessary to interact with the device at all. To facilitate determination of which one of active application(s) 210 may be terminated over another, process termination strategy 200 can provide an additional level of granularity, such as by giving higher priority to user interface process(es) 212 relative to background process(es) 214 (e.g., processes that provide data or other services for user interface process(es) 212). A similar approach can be used for active foreground application(s) 220, in which user interface process(es) 222 take precedence over background process(es) 224, and for active background application(s) 230, in which process termination strategy 200 designates user interface process(es) 232 as more critical than background process(es) 234.

Active foreground application(s) 220 may include an application that is visible to the user or otherwise presenting data to the user but may not be an application with which the user is directly interacting. For example, a computing device may be capable of displaying GUIs associated with multiple applications on a display at once but the user may only be able to interact with one of those applications, and active foreground application(s) 220 can include the remaining displayed application(s). In some embodiments, process termination strategy 200 can categorize active foreground application(s) 220 as highly critical and may not be killed unless necessary to keep active application(s) 210 running.

Active background application(s) 230 may be associated with graphical user interfaces that are not visible to the user or may not otherwise be directly presenting data to the user. Although active background application(s) 230 may not be directly interactive or otherwise capable of directly presenting data to the user, active background application(s) 230 may nonetheless perform useful tasks, such as tracking biometric data or downloading data from a network location. Thus, process termination strategy 200 may call for continued execution of the instructions associated with background application(s) 230 until there is insufficient memory to retain them alongside active application(s) 210 and active foreground application(s) 220.

Cached process(es) 240 can include a process that performs no activity but may be retained in memory for caching purposes, such as to improve startup time the next time of execution of the instructions of the cached process(es) 240. In an embodiment, process termination strategy 200 may periodically kill cached process(es) 240 to balance overall system resources between process cache(s) and kernel cache(s) of a computing device.

In some embodiments, a priority level of a process may also be adjusted or weighted relative to other processes within the priority level based on additional factors such as the last time the process was used (e.g., a least recently used (LRU) process can have a lower priority level than a more recently used process), process usage (e.g., a process that is more frequently used may have a higher priority than a process that is less frequently used), process dependencies (e.g., a process's priority level may be greater because other processes are dependent on it or a process that is serving another process can never have a lower priority than the process it is serving), an amount of RAM usage (e.g., a process using more memory may have lower priority than a process using less memory), among other factors.

In some embodiments, process termination strategy 200 can include determining and assigning a metric, label, tag, or other metadata indicating a priority level of a process. For example, in an embodiment, the priority level of a process can be represented as a number whose value is dynamically managed by a memory management system of a computing device. Smaller values may indicate a higher level of priority, and concomitantly, less of a likelihood of termination of the process. For instance, a value of −10 can represent the highest priority level for a process and 10 may represent the lowest priority level. In an embodiment, negative priority level values, which correspond to higher priority levels, can be reserved for system or kernel applications while user applications can have a priority level range from 0-10.

An effect of process termination strategy 200 is that, upon a process becoming invisible or not otherwise directly interactive, the likelihood that the process will be terminated changes from highly unlikely to highly likely. Process termination strategy 200 assumes that a process directly interacted with by the user is more critical relative to the invisible/un-interactive process, and the latter process may be terminated prior to the former process. Forced termination of a process, especially a process of a launching application, however, may not offer users the optimal user experience.

Figure 3:
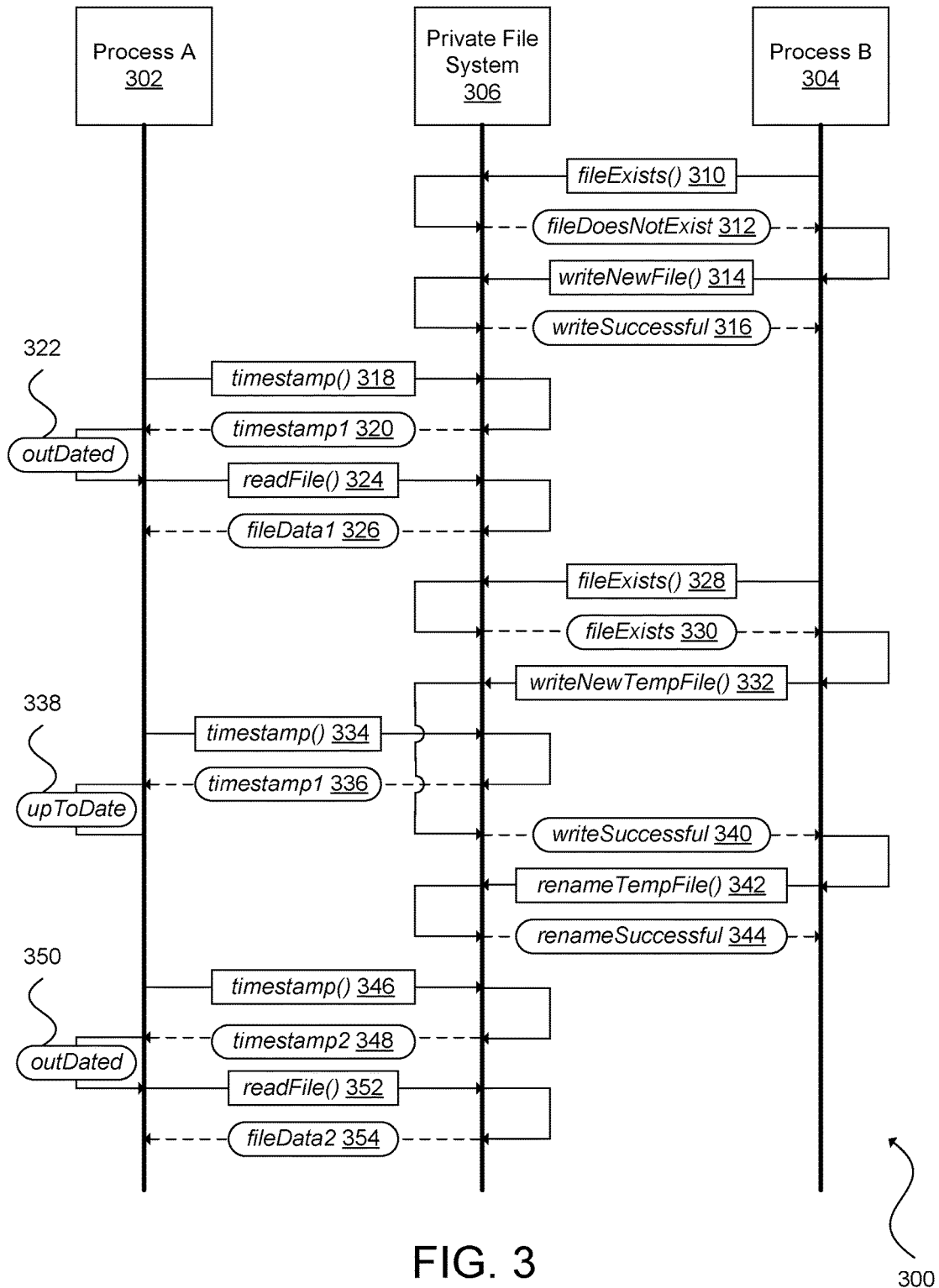
FIG. 3 illustrates a sequence diagram of an example method for enabling inter-process communication for mobile computing devices that may be used in an embodiment.

FIG. 3 illustrates a sequence diagram 300 of an example method for enabling inter-process communication for a single active application or multiple active applications capable of sharing readable/writeable data in memory to reduce the number of forced terminations by a multitasking computing device. It should be understood that, for any process discussed herein, there can be additional, fewer, or alternative steps performed in similar or alternative orders, or in parallel, within the scope of various embodiments unless otherwise stated.

In this example, an active application that may cause a launching application to be killed or that is otherwise affected by or effect low-memory conditions can be refactored to execute within one or more first processes 302 for handling one or more discrete functions of the original application and one or more second processes 304 for handling other functionality of the original application. First process(es) 302 can include one or more light-weight processes for performing the discrete task, and second process(es) 304 can include one or more heavy-weight processes that utilize a greater amount of main memory than first process(es) 302. However, the instructions of second process(es) 304 may be designed to execute only when the instructions of first process(es) 302 modifies (modify) data in private file system 306 or when the instructions of second process(es) 304 update the data in private file system 306. In this manner, second process(es) 304 may take up only an amount of main memory as large as necessary for execution of the instructions of first process(es) 302 to complete the discrete task.

In some embodiments, the refactored application may be implemented using a producer-consumer pattern in which first process(es) 302 may operate as a consumer that reads shared data generated and written or stored to private file system 306 by second process(es) 304. It will be appreciated that first process(es) 302 may also operate as a producer by writing or storing data to private file system 306 to be consumed by second process(es) 304. For example, first process(es) 302 can include user interface functionality, and first process(es) can share user input with second process(es) 304 using the example method shown in FIG. 3.

Example method 300 for providing inter-process communication for a single application or multiple applications capable of sharing readable/writeable data in memory can begin at sequence 310 of sequence diagram 300 in which second process(es) 304 may perform a check to determine whether a file having a specified file name (e.g., F) exists in private file system 306. Each sequence of diagram 300 may correspond to one or more instructions executed by a CPU of a computing device implementing the example method. Although a file, file metadata (e.g., file name, date of creation, date of modification, other timestamp, etc.), and a file system are used in this example, it will be appreciated by one of ordinary skill in the art that these abstractions are used for simplicity and conciseness. Other suitable data structures and encodings known to a person of ordinary skill can also be implemented in various embodiments.

In some embodiments, data to be shared between first process(es) 302 and second process(es) 304 can encompass multiple files for each discrete function of the original application or another suitable approach for organizing the files, such as to limit file sizes to a specific size. The specified file name(s) may be included in read-only configuration data for the application.

At sequence 312, the check whether a file named F exists in private file system 306 indicates that no file having the specified file name exists. This can prompt second process(es) 304, at sequence 314, to write or store data to be consumed by first process(es) 302 to a new file having the specified file name to private file system 306. Writing the new file F to private file system 306 is successful as shown by sequence 316. A timestamp or other suitable metadata (e.g., a monotonically increasing or decreasing metadata field) is assigned or associated with the new file F as part of the process of writing or storing the new file F (or as part of the renaming of new file F in some file systems).

The example method can progress to sequences 318 and 320 in which first process(es) 302 can determine a timestamp or other suitable metadata of the file having the specified file name in private file system 306 (e.g., T of F). First process(es) 302 may utilize the timestamp or other suitable metadata at sequence 322 to determine the validity of the contents of file F. File F is valid to read within portions of memory associated with first process(es) when that file is determined to be the most recently updated data written or stored to private file system 306 and/or determined not to be corrupted. In this particular sequence, first process(es) 302 may operate from a "cold start" such that first process(es) 302 may have no previous timestamp or other suitable metadata with which to evaluate against the timestamp or other suitable metadata of file F. Here, process(es) 302 may assume that any data in virtual address space 102 and previously associated with file F is outdated and can safely retrieve the contents of file F as shown in sequences 324 and 326. The timestamp or other suitable metadata assigned or associated with file F is also retrieved with file F.

In another scenario, second process(es) 304 may receive new and/or updated data associated with the file name F that is to be written or stored to private file system 306. To handle this situation, second process(es) 304 can determine at sequence 328 whether a file having the specified file name already exists in private file system 306. This time around, second process(es) 304 determines that F already exists in private file system 306, as indicated by sequence 330, and writes or stores the new and/or updated data to a new temporary file (e.g., F') in private file system 306, as indicated by sequence 332. In the interim, first process(es) 302 may perform another validity check of the data associated with F by determining the timestamp T or other suitable metadata of file F in private file system 306, as shown by sequence 334, and evaluating at sequence 338 the timestamp or other suitable metadata of sequence 336 against the timestamp or other suitable metadata received at sequence 320. The timestamps or other suitable metadata of sequences 320 and 336 are the same, and no additional action is necessary by first process(es) 302 because it has up-to-date data associated with file F. It should be noted that first process(es) 302 observe(s) a consistent view of the data associated with file F during the period of time second process(es) 304 writes new file F' to private file system 306. First process(es) 302 can obtain the updated data the next time first process(es) 302 may compare previously determined timestamp or other suitable metadata with timestamp or other suitable metadata of the file F in private file system 306 as discussed further below.

Second process(es) 304 completes writing F' to private file system 306 at sequence 340. To update the data associated with F, second process(es) 304 can rename file F' to file F, as indicated by sequences 342 and 344. In various embodiments, the process of writing a temporary file and renaming the temporary file from F' to F may be considered to be atomic because these operations are effectively instantaneous with respect to first process(es) 302.

At a later time associated with sequences 346 and 348, first process(es) 302 may determine the new timestamp (e.g., T') or other suitable metadata associated with F' (now named F), compare the new timestamp or other suitable metadata with the previous timestamp or other suitable metadata determined at sequence 320 or sequence 336 (e.g., T), and conclude that its data associated with F is outdated at sequence 350 (e.g., T<T'). Therefore, first process(es) 302 may retrieve the data associated with file F' (now named F) as indicated by sequences 352 and 354.

These operations can provide a number of advantages. By using shared memory, and management of the naming and timestamps or other suitable metadata for file F, it may not be necessary to launch second process(es) 304 and/or ensure that second process(es) are retained in main memory simply to retrieve file F. If second process(es) 304 are not launched or kept in main memory simply to provide data to first process(es) 302, then second process(es) 304 will not require an extensive amount of memory that may lead to termination of a launching application. Similarly, first process(es) 302 may have access to data in file F, even when second process(es) 304 update the data in file F.

On rare occasions, first process(es) 302 may attempt to retrieve a file having a specified file name that does not exist in private file system 306. This may happen under unusual circumstances, such as when the specified file name is stored in read-only configuration data and that configuration data is deleted during the operation of first process(es) 302 and/or second process(es) 304, when a memory management system forces second process(es) 304 to terminate (e.g., the memory management system may stop associating any part of main memory with the process space(s) of second process(es) 304, and the memory management system can allocate the main memory previously reserved for second process(es) 304 to one or more other processes), and other similar scenarios. In these instances, execution of the instructions of first process(es) 302 can cause the instructions of second process(es) 304 to be executed in order to provide data that first process(es) 302 may need to complete the task at hand. However, if second process(es) 302 are quickly wound down after updating the shared data, the launching application or other applications may not be terminated.

In some embodiments, a computing device that implements a portion or all of the systems and methods described herein may be a general-purpose computing device, such as computing system 400 illustrated in FIG. 4, that includes or is configured to access one or more computer-accessible media. In the illustrated embodiment, computing system 400 includes one or more processors 410a-n coupled to main memory 420 via an input/output (I/O) interface 430. Computing system 400 further includes network interface 440 coupled to I/O interface 430.

In some embodiments, computing system 400 may be a uniprocessor system including one processor 410a, or a multiprocessor system including several processors 410a-n (e.g., two, four, eight, or another suitable number). Processors 410a-n may be any suitable processors capable of executing instructions. For example, in various embodiments, processors 410a-n may be general-purpose or embedded processors implementing any of a variety of instruction set architectures (ISAs), such as the x86, PowerPC, SPARC, or MIPS ISAs, or any other suitable ISA. In multiprocessor systems, each of processors 400a-n may commonly, but not necessarily, implement the same ISA.

Main memory 420 may store instructions and data accessible by processor(s) 410a-n. In various embodiments, main memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within main memory 420 as code 425 and data 426.

In one embodiment, I/O interface 430 may coordinate I/O traffic between processor(s) 410a-n, main memory 420, and any peripheral devices in computing system 400, including network interface 440 or other peripheral interfaces. In some embodiments, I/O interface 430 may perform any necessary protocol, timing, or other data transformations to convert data signals from one component (e.g., main memory 420) into a format suitable for use by another component (e.g., processor(s) 410a-n). In some embodiments, I/O interface 430 may support devices attached through various types of peripheral buses, such as a variant of the Peripheral Component Interconnect (PCI) bus standard or the Universal Serial Bus (USB) standard. In some embodiments, the function of I/O interface 430 may be split into two or more separate components, such as a north bridge and a south bridge. Also, in some embodiments some or all of the functionality of I/O interface 430, such as an interface to main memory 420, may be incorporated directly into processor(s) 410a-n.

Network interface 440 can allow data to be exchanged between computing system 400 and other computing devices 460 attached to network(s) 450. In various embodiments, network interface 440 may support communication via any suitable wired or wireless general data networks, such as Ethernet, Wi-Fi/wireless local area network (WLAN), or other suitable types of data networks. Additionally, network interface 440 may support communication via telecommunications/telephony networks such as analog voice networks or digital fiber communications networks, via storage area networks such as Fibre Channel SANs, or via any other suitable type of network and/or protocol.

In some embodiments, main memory 420 may be implemented as a computer-accessible medium to store program instructions and data as described above for implementing embodiments of systems and disclosed herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing system 400 via I/O interface 430. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing system 400 as main memory 420 or another type of memory. Further, a computer-accessible medium may include transmission media or signals such as electrical, electromagnetic, or digital signals, conveyed via a communication medium such as a network and/or a wireless link, such as may be implemented via network interface 440.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining, by one or more processors of a computing device executing first instructions associated with a first process of a first active application of the computing device, a first timestamp of a first file of a private file system of the computing device, the first process associated with a first amount of main memory of the computing device, the first file having a first name, the private file system being accessible to the first process and a second process of the first application, the second process associated with a second amount of main memory greater than the first amount;

writing, by the one or more processors executing second instructions associated with the second process, to the private file system a second file having a second name and a second timestamp;

renaming, by the one or more processors executing the second instructions, the second file from the second name to the first name;

determining, by the one or more processors executing the first instructions, that the second file includes more recently updated data than data of the first file by comparing the first timestamp and the second timestamp; and receiving, by the one or more processors executing the first instructions, the second file to a portion of the main memory accessible to the first process and inaccessible to the second process.

2. The computer-implemented method of claim 1, further comprising:

causing, by the one or more processors executing third instructions associated with a third process of a second active application of the computing device, at least one of the first process or the second process to be loaded into the main memory; and maintaining at least a portion of the third process in the main memory during execution of at least one of the first instructions or the second instructions.

3. The computer-implemented method of claim 1, further comprising:

determining, by the one or more processors executing the first instructions, that the first file includes most recently updated data by matching the first timestamp and a stored timestamp during a period of time that the one or more processors write the second file to the private file system and before the one or more processors complete writing the second file to the private file system; and receiving, by the one or more processors executing the first instructions, the first file to the portion of the main memory accessible to the first process and inaccessible to the second process.

4. A computing device, comprising:

one or more processors; and memory including a first portion of main memory associated with a first process of a first active application, a second portion of main memory greater than the first portion associated with a second process of the first application, and kernel instructions that, upon execution by the one or more processors, cause the computing device to:

execute one or more first instructions associated with the first process of the first application to determine a first timestamp of a first file of a private file system of the computing device, the first file having a first name, the private file system being accessible to the first process and the second process of the first application;

execute one or more second instructions associated with the second process of the first application to write to the private file system a second file having a second name and a second timestamp and to rename the second file from the second name to the first name;

compare the first timestamp and the second timestamp to determine that the second file includes more recently updated data than data of the first file; and receive, by executing the first instructions associated with the first process of the first application, the second file to a portion of the main memory accessible to the first process and inaccessible to the second process.

5. The computing device of claim 4, wherein the kernel instructions upon execution further cause the computing device to:

execute third instructions associated with a third process of a second active application of the computing device to cause at least one of the first process or the second process to be loaded into the main memory; and maintain at least a portion of the third process in the main memory during execution of at least one of the first instructions or the second instructions.

6. The computing device of claim 4, wherein the kernel instructions upon execution further cause the computing device to execute the first instructions associated with the first process of the first application to:

determine that the first file includes most recently updated data by matching the first timestamp and a stored timestamp during a period of time that the one or more processors write the second file to the private file system and before the one or more processors complete writing the second file to the private file system; and receive the first file to the portion of the main memory accessible to the first process and inaccessible to the second process.

* * * * *